United States Patent
Xiao et al.

(10) Patent No.: US 10,217,293 B2
(45) Date of Patent: Feb. 26, 2019

(54) DEPTH CAMERA-BASED HUMAN-BODY MODEL ACQUISITION METHOD AND NETWORK VIRTUAL FITTING SYSTEM

(71) Applicant: SHENZHEN ORBBEC CO., LTD., Shenzhen, Guangdong (CN)

(72) Inventors: Zhenzhong Xiao, Guangdong (CN); Honghuai Xu, Guangdong (CN); Long Liu, Guangdong (CN); Yuanhao Huang, Guangdong (CN)

(73) Assignee: Shenzhen Orbbec Co., Ltd., Shenzhen (CN)

(*) Notice: Subject to any disclaimer, the term of this patent is extended or adjusted under 35 U.S.C. 154(b) by 109 days.

(21) Appl. No.: 15/317,830

(22) PCT Filed: May 21, 2015

(86) PCT No.: PCT/CN2015/079449
§ 371 (c)(1),
(2) Date: Dec. 9, 2016

(87) PCT Pub. No.: WO2015/188685
PCT Pub. Date: Dec. 17, 2015

(65) Prior Publication Data
US 2017/0140578 A1    May 18, 2017

(30) Foreign Application Priority Data

Jun. 12, 2014 (CN) .......................... 2014 1 0259542

(51) Int. Cl.
*G06T 19/20* (2011.01)
*H04N 13/257* (2018.01)
(Continued)

(52) U.S. Cl.
CPC ............ *G06T 19/20* (2013.01); *G06T 3/4038* (2013.01); *G06T 7/75* (2017.01); *G06T 17/00* (2013.01);
(Continued)

(58) Field of Classification Search
CPC combination set(s) only.
See application file for complete search history.

(56) References Cited

U.S. PATENT DOCUMENTS 6,907,310 B2 * 6/2005 Gardner ................. A41H 1/00
                                                          700/132
8,570,320 B2 * 10/2013 Izadi ....................... G06T 17/00
                                                          345/156
(Continued)

FOREIGN PATENT DOCUMENTS

CN   103106604 A   5/2013
CN   104008571 A   8/2014

OTHER PUBLICATIONS

International Search Report for Application No. PCT/CN2015/079449, dated Sep. 2, 2015, 4 pages.

*Primary Examiner* — Anand P Bhatnagar
(74) *Attorney, Agent, or Firm* — Sheppard Mullin Richter & Hampton LLP

(57) ABSTRACT

The present invention relates to a human body model acquisition method and a virtual network fitting system based on depth cameras. The method includes the following steps: step S1: generating mark points covering a model body surface and used for determining features of the model body surface on the model body surface, meanwhile collecting depth images of the model body from a plurality of angles by using the depth cameras to acquire a depth image sequence that covers the model body surface and contains the mark points; step S2: carrying target depth information point cloud grid reconstruction on frames of depth images in the depth image sequence; and step S3: mosaicing the reconstructed frames of depth images into a three-dimensional model of the model body according to the mark points in the reconstructed frames of depth images. Compared with the prior art, by adopting the human body model acquisition method and the virtual network fitting system based on the depth cameras provided by the present invention, the accurate three-dimensional human body model and the accurate three-dimensional garment model can be acquired, and virtual fitting is carried out accordingly to acquire a real fitting effect.

20 Claims, 3 Drawing Sheets

(51) Int. Cl.
*H04N 13/282* (2018.01)
*G06T 17/00* (2006.01)
*G06T 7/73* (2017.01)
*G06T 3/40* (2006.01)

(52) U.S. Cl.
CPC ......... *H04N 13/257* (2018.05); *H04N 13/282* (2018.05); *G06T 2200/08* (2013.01); *G06T 2200/32* (2013.01); *G06T 2207/10028* (2013.01); *G06T 2207/30196* (2013.01); *G06T 2210/16* (2013.01); *G06T 2219/2012* (2013.01)

(56) References Cited

U.S. PATENT DOCUMENTS

| | | | | |
|---|---|---|---|---|
| 9,053,571 | B2* | 6/2015 | Shotton | G06T 17/10 |
| 9,245,344 | B2* | 1/2016 | Shim | G06T 5/005 |
| 9,959,569 | B2* | 5/2018 | Adeyoola | G06T 19/006 |
| 2002/0158873 | A1* | 10/2002 | Williamson | G06T 15/20 |
| | | | | 345/427 |
| 2003/0011590 | A1* | 1/2003 | Kung | G06T 17/00 |
| | | | | 345/419 |
| 2003/0214502 | A1* | 11/2003 | Park | G06T 15/205 |
| | | | | 345/420 |
| 2004/0049309 | A1* | 3/2004 | Gardner | A41H 1/00 |
| | | | | 700/132 |
| 2004/0236456 | A1* | 11/2004 | Pieper | A61F 13/84 |
| | | | | 700/132 |
| 2008/0111816 | A1* | 5/2008 | Abraham | G06Q 30/06 |
| | | | | 345/420 |
| 2010/0111370 | A1* | 5/2010 | Black | G06K 9/00369 |
| | | | | 382/111 |
| 2010/0194862 | A1* | 8/2010 | Givon | G03H 1/268 |
| | | | | 348/49 |
| 2013/0136318 | A1* | 5/2013 | Hassebrook | G01B 11/2513 |
| | | | | 382/115 |
| 2014/0111507 | A1* | 4/2014 | Kim | G06T 17/00 |
| | | | | 345/419 |
| 2014/0168217 | A1* | 6/2014 | Kim | G06T 13/40 |
| | | | | 345/420 |
| 2014/0293016 | A1* | 10/2014 | Benhimane | G06T 17/00 |
| | | | | 348/50 |
| 2015/0332464 | A1* | 11/2015 | O'Keefe | G06K 9/00201 |
| | | | | 348/47 |
| 2016/0078663 | A1* | 3/2016 | Sareen | G06T 19/00 |
| | | | | 345/419 |

* cited by examiner

DEPTH CAMERA-BASED HUMAN-BODY MODEL ACQUISITION METHOD AND NETWORK VIRTUAL FITTING SYSTEM

TECHNICAL FIELD

The present invention relates to the technical field of three-dimensional models, and particularly to a human body model acquisition method and a virtual network fitting system based on depth cameras.

BACKGROUND

In the field of garment industry, the use of a virtual fitting system can allow customers to browse different fitting effects of different garments within the shortest time, but also can help garment designers to accumulate more fitting effect materials and shorten the garment design cycles, thereby having a great impact in the industry. But the existing virtual fitting systems lack real fitting effects, the customers cannot determine the sizes of the garments according to their own statures either, 3D human body models established by some virtual fitting systems are acquired by calling data, which have some errors compared with real 3D human body models, the garment models are not 3D either, thereby lacking real details and other effects, and fabrics, folds and other real effects are not considered either. 3D human body model acquisition methods adopted in some virtual fitting systems can merely achieve partial approximation to human body, and cannot accurately and completely establish the 3D human body models, thereby lacking accurate 3D human body models and 3D garment model bases with rich details. In this case, the customers cannot determine the sizes of garments they need.

SUMMARY

The technical problem to be solved in the present invention is to provide a human body model acquisition method and a virtual network fitting system based on depth cameras, in order to solve the shortcomings in the prior art that a three-dimensional human body model cannot be established accurately and that a real fitting effect cannot be realized. The present invention is implemented as follows:

a human body model acquisition method based on depth cameras includes the following steps:

step S1: generating mark points covering a model body surface and used for determining features of the model body surface on the model body surface, meanwhile collecting depth images of the model body from a plurality of angles by using the depth cameras to acquire a depth image sequence that covers the model body surface and contains the mark points;

step S2: carrying target depth information point cloud grid reconstruction on frames of depth images in the depth image sequence; and step S3: mosaicing the reconstructed frames of depth images into a three-dimensional model of the model body according to the mark points in the reconstructed frames of depth images;

wherein prior to step S2, the method further includes the following steps:

preprocessing the frames of depth images in the depth image sequence acquired in step S1 according to the following steps:

estimating the position of the model body in the depth image through segmenting a foreground by a median;

placing a model body outline generating seed at the center of the position;

diffusing the model body outline by depth search based on smoothness constraint, generating an accurate model body outline, extracting the model body outline, and meanwhile removing the rest parts in the depth image as backgrounds;

when the model body outline of the next frame of depth image is extracted, extracting the model body outline in combination with the outline extraction result of the previous frame;

wherein when the depth image is a rigid-body depth image:

specifically, the step S1 is as follows:

irradiating the model body from 360 degrees by using structured light generated by the depth cameras, so as to generate the mark points for determining the feature information of irradiation sites on the irradiation sites; and collecting the depth images of the irradiation sites by using the depth cameras during the irradiation to acquire the depth image sequence that covers the model body surface and contains the mark points;

the step S3 is specifically as follows:

mosaicing the mark points with correlation higher than a set value according to the correlation of the mark points in every two adjacent frames of depth images in the reconstructed frames of depth images, and deleting the mark points with correlation lower than the set value, so as to mosaic the frames of depth images into the three-dimensional model of the model body;

wherein when the depth image is a non-rigid-body depth image:

the step S1 is specifically as follows:

irradiating the model body from 360 degrees by using light spots of random lattices generated by the depth cameras, so as to generate the mark points for determining the feature information of irradiation sites on the irradiation sites; and collecting the depth images of the irradiation sites by using the depth cameras during the irradiation to acquire the depth image sequence that covers the model body from 360 degrees and contains the mark points; and the step S3 is specifically as follows:

mosaicing the mark points with correlation higher than the set value according to the correlation of the mark points in every two adjacent frames of depth images in the reconstructed frames of depth images, and deleting the mark points with correlation lower than the set value, so as to mosaic the frames of depth images into the three-dimensional model of the model body.

Further, during the mosaicing, the three-dimensional model is generated according to weights of the rigid-body depth images and the non-rigid-body depth images in the depth image sequence.

Further, when step S1 is implemented:

the model body is photographed by a plurality of depth cameras arranged at different angle positions according to a set photographing frequency, and the model body rotates automatically according to a set angular speed during photography until the plurality of depth cameras arranged at different angle positions acquire the depth image sequence that covers the model body from 360 degrees together.

Further, three depth cameras are arranged, and the arrangement positions of the three depth cameras are as follows:

two depth cameras are arranged to scan an upper part and a lower part of the model body respectively, and the upper part and the lower part are not overlapped;

the other depth camera is arranged to scan a middle part of the model body, and the middle part is partially overlapped with the upper part and the lower part; and the three depth cameras are arranged in such a manner that any one of the depth cameras cannot photograph the other two depth cameras when photographing the model body.

Further, the method further includes the following steps:

acquiring a color image sequence that covers the model body from 360 degrees by color cameras; and matching the color image sequence with the depth image sequence, and fusing the color image sequence into the depth image sequence.

A human body model acquisition method based on depth cameras includes the following steps:

step S1: generating mark points covering a model body surface and used for determining features of the model body surface on the model body surface, meanwhile collecting depth images of the model body from a plurality of angles by using the depth cameras to acquire a depth image sequence that covers the model body surface and contains the mark points;

step S2: carrying target depth information point cloud grid reconstruction on frames of depth images in the depth image sequence; and step S3: mosaicing the reconstructed frames of depth images into a three-dimensional model of the model body according to the mark points in the reconstructed frames of depth images.

Further, when the depth image is a rigid-body depth image:

the step S1 is specifically as follows:

irradiating the model body from 360 degrees by using structured light generated by the depth cameras, so as to generate the mark points for determining the feature information of irradiation sites on the irradiation sites; and collecting the depth images of the irradiation sites by using the depth cameras during the irradiation to acquire the depth image sequence that covers the model body surface and contains the mark points;

the step S3 is specifically as follows:

mosaicing the mark points with correlation higher than a set value according to the correlation of the mark points in every two adjacent frames of depth images in the reconstructed frames of depth images, and deleting the mark points with correlation lower than the set value, so as to mosaic the frames of depth images into the three-dimensional model of the model body;

when the depth image is a non-rigid-body depth image:

the step S1 is specifically as follows:

irradiating the model body from 360 degrees by using light spots of random lattices generated by the depth cameras, so as to generate the mark points for determining the feature information of irradiation sites on the irradiation sites; and collecting the depth images of the irradiation sites by using the depth cameras during the irradiation to acquire the depth image sequence that covers the model body from 360 degrees and contains the mark points; and the step S3 is specifically as follows:

mosaicing the mark points with correlation higher than the set value according to the correlation of the mark points in every two adjacent frames of depth images in the reconstructed frames of depth images, and deleting the mark points with correlation lower than the set value, so as to mosaic the frames of depth images into the three-dimensional model of the model body.

Further, during the mosaicing, the three-dimensional model is generated according to weights of the rigid-body depth images and the non-rigid-body depth images in the depth image sequence.

Prior to step S2, the method further includes the following steps:

preprocessing the frames of depth images in the depth image sequence acquired in step S1 according to the following steps:

estimating the position of the model body in the depth image through segmenting a foreground by a median;

placing a model body outline generating seed at the center of the position;

diffusing the model body outline by depth search based on smoothness constraint, generating an accurate model body outline, extracting the model body outline, and meanwhile removing the rest parts in the depth image as backgrounds; and when the model body outline of the next frame of depth image is extracted, extracting the model body outline in combination with the outline extraction result of the previous frame.

Further, when step S1 is implemented:

the model body is photographed by a plurality of depth cameras arranged at different angle positions according to a set photographing frequency, and the model body rotates automatically according to a set angular speed during photography until the plurality of depth cameras arranged at different angle positions acquire the depth image sequence that covers the model body from 360 degrees together.

Further, three depth cameras are arranged, and the arrangement positions of the three depth cameras are as follows:

two depth cameras are arranged to scan an upper part and a lower part of the model body respectively, and the upper part and the lower part are not overlapped;

the other depth camera is arranged to scan a middle part of the model body, and the middle part is partially overlapped with the upper part and the lower part; and the three depth cameras are arranged in such a manner that any one of the depth cameras cannot photograph the other two depth cameras when photographing the model body.

Further, the method further includes the following steps:

acquiring a color image sequence that covers the model body from 360 degrees by color cameras; and matching the color image sequence with the depth image sequence, and fusing the color image sequence into the depth image sequence.

Further, the method further includes the following steps:

acquiring a plurality of three-dimensional models of the model body, and establishing a database of the three-dimensional models of the model body;

acquiring three-dimensional models of model fitting effects when a model tries garments with different sizes and at different postures, and establishing virtual fitting training samples accordingly; and carrying out fitting training according to the virtual fitting training samples, and establishing a database of the three-dimensional models of the virtual model fitting effects.

Further, the method further includes the following steps:

acquiring a three-dimensional garment model, and matching the three-dimensional garment model with the three-dimensional model of the model body to generate a three-dimensional model of virtual fitting effects.

A virtual network fitting system based on depth cameras includes:

a depth image collection module, used for collecting a depth image sequence that covers a model body from 360 degrees;

a point cloud grid reconstruction module, used for carrying target depth information point cloud grid reconstruction on each frame of depth image in the depth image sequence;

a three-dimensional human body model establishment module, used for mosaicing the reconstructed frames of depth images into a three-dimensional model of the model body;

a three-dimensional garment model collection module, used for acquiring a three-dimensional garment model;

a fitting module, used for matching the three-dimensional garment model with the three-dimensional model of the model body to generate a three-dimensional model of fitting effects; and a network interface module, used for outputting the three-dimensional model of fitting effects through a network.

Further, the fitting module is used for generating the three-dimensional garment model according to the specification and the size of the garment.

Further, the fitting module is used for generating the three-dimensional garment model according to a garment depth image.

Further, the three-dimensional model of the model body includes three-dimensional models of the model body of a plurality of postures, and the system further includes:

a database of the three-dimensional models of the model body, used for storing the three-dimensional models of the model body of different postures.

Further, the system further includes a database of three-dimensional models of virtual fitting effects; the database of three-dimensional models of virtual fitting effects is generated according to a plurality of fitting training samples; and the fitting training samples are generated according to a plurality of three-dimensional models of fitting effects.

Further, the system further includes:

a color image collection module, used for collecting color images of the model body and the garment and respectively matching and fusing the color images into the three-dimensional model of the model body and the three-dimensional garment model.

Compared with the prior art, by adopting the human body model acquisition method and the virtual network fitting system based on the depth cameras provided by the present invention, the accurate three-dimensional human body model and the accurate three-dimensional garment model can be acquired, and virtual fitting is carried out accordingly to acquire a real fitting effect.

DETAILED DESCRIPTION OF SOME EMBODIMENTS

In order to clearly show the objects, technical solutions and advantages of the present invention, a further detailed description of the present invention will be given below in combination with accompanying drawings and embodiments. It should be understood that the specific embodiments described herein are merely used for illustrating the present invention, rather than limiting the present invention.

Figure 1:
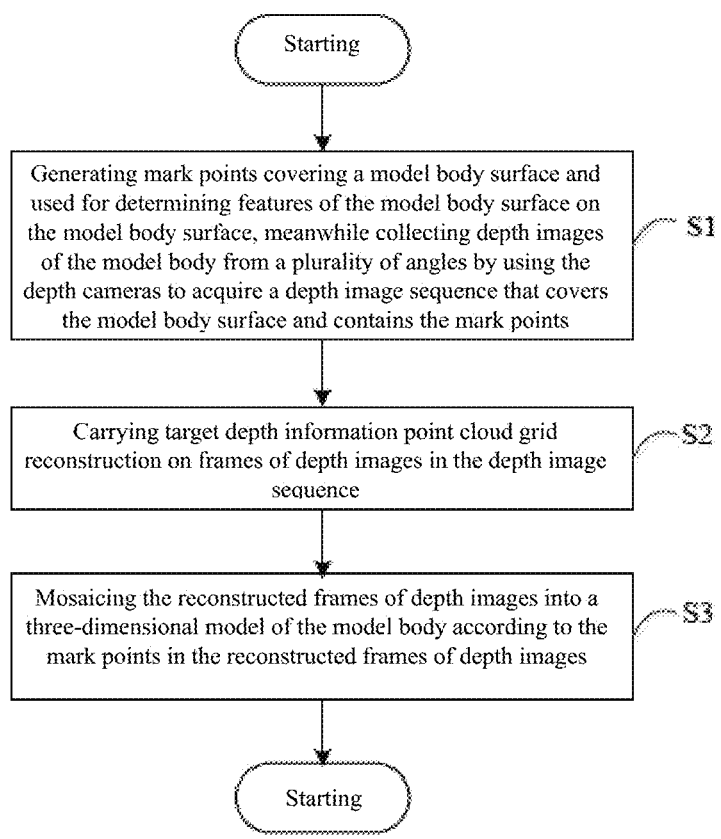
FIG. 1 is a schematic flow diagram of a human body model acquisition method based on depth cameras provided by an embodiment of the present invention.
Figure 2:
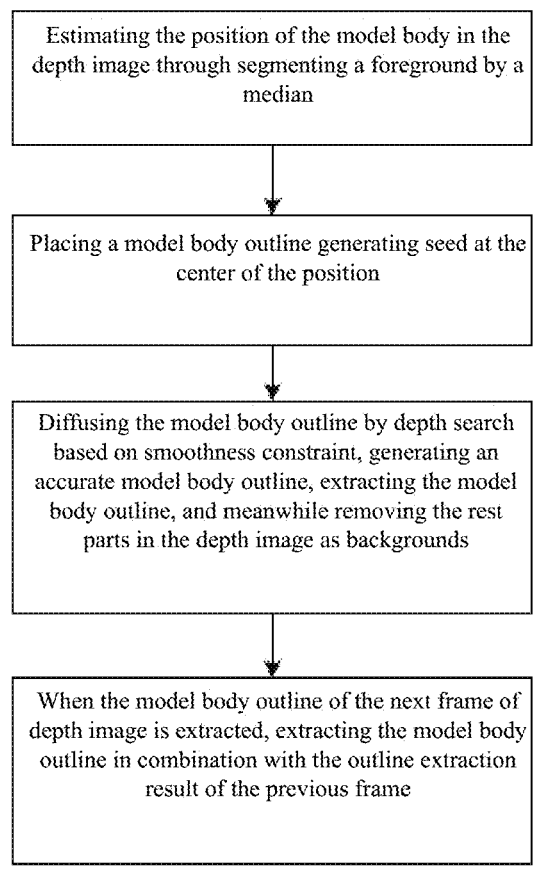
FIG. 2 is a schematic flow diagram of preprocessing of a depth image.

As shown in FIG. 1, a human body model acquisition method based on depth cameras provided by the present invention includes the following steps:

step S1: generating mark points covering a model body surface and used for determining features of the model body surface on the model body surface, meanwhile collecting depth images of the model body from a plurality of angles by using the depth cameras to acquire a depth image sequence that covers the model body surface and contains the mark points;

step S2: carrying target depth information point cloud grid reconstruction on frames of depth images in the depth image sequence; and step S3: mosaicing the reconstructed frames of depth images into a three-dimensional model of the model body according to the mark points in the reconstructed frames of depth images.

In the embodiment, a rigid body is processed by parameters of structured light generated in the depth cameras. The structured light generally has a periodic arrangement feature, for example, light spots are in the shapes of grids, lattices and the like, when an object is scanned by using the structured light, the cross points of these grid-shaped light spots and the lattices of the lattice-shaped light spots are automatically used as selected feature points, and the parameter feature points of the structured light are adaptively used as mark points in merging and registering processes. For the rigid body, initial alignment of two models needs to be given at first, then some corresponding point pairs (e.g., closest point pairs) are selected on the two models, rigid body transformation between the models are solved through these point pairs, the rigid body transformation is acted on the models, and iteration is carried out in this way. For the rigid body, a three-dimensional human body model can be mosaiced by the following basic steps:

step 1: irradiating the structured light on a photographed object to generate the mark points;

step 2: adjusting the irradiation direction of the structured light to irradiate the photographed object from another angle;

step 3: mosaicing the points with high correlation according to the correlation of the light spots irradiated on the object;

step 4: deleting the light spots with low correlation; and step 5: mosaicing the light spots into the three-dimensional human body model.

Specifically, step S1 is specifically as follows: irradiating the model body from 360 degrees by using the structured light generated by the depth cameras, so as to generate the mark points for determining the feature information of irradiation sites on the irradiation sites, and collecting the depth images of the irradiation sites by using the depth cameras during the irradiation to acquire the depth image sequence that covers the model body surface and contains the mark points. Step S3 is specifically as follows: mosaicing the mark points with correlation higher than a set value according to the correlation of the mark points in every two adjacent frames of depth images in the reconstructed frames of depth images, and deleting the mark points with correlation lower than the set value, so as to mosaic the frames of depth images into the three-dimensional model of the model body.

For a non-rigid body, the feature points are selected in a manner of random points, after the structured light irradiates the non-rigid body, since the non-rigid body will continuously change the shape structure, but the depth cameras cannot automatically follow the non-rigid body to adaptively change when photographing a frame, the mark points are randomly selected to serve as the mark points in the merging and registering processes. For the non-rigid body, correct model parameters can be estimated from an observation data set containing "random lattices" in an iterative manner. The method achieves the purpose by repeatedly selecting a group of random subsets in the data, and the selected subsets are assumed as points inside. For the non-rigid body, the three-dimensional human body model can be mosaiced by the following basic steps:

step 1: generating light spots of a group of random lattices, irradiating a photographed object with the light spots, and using the light spots of these random lattices as the mark points;

step 2: irradiating the photographed object from another angle by using the random lattices;

step 3: carrying out iterative computation on corresponding spots in two times of irradiation, and calculating the correlation of the corresponding spots in two states; and step 4: mosaicing the spots with high correlation into the three-dimensional model.

Specifically, step S1 is specifically as follows: irradiating the model body from 360 degrees by using light spots of random lattices generated by the depth cameras, so as to generate the mark points for determining the feature information of irradiation sites on the irradiation sites, and collecting the depth images of the irradiation sites by using the depth cameras during the irradiation to acquire the depth image sequence that covers the model body from 360 degrees and contains the mark points. Step S3 is specifically as follows: mosaicing the mark points with correlation higher than the set value according to the correlation of the mark points in every two adjacent frames of depth images in the reconstructed frames of depth images, and deleting the mark points with correlation lower than the set value, so as to mosaic the frames of depth images into the three-dimensional model of the model body.

Figure 4:
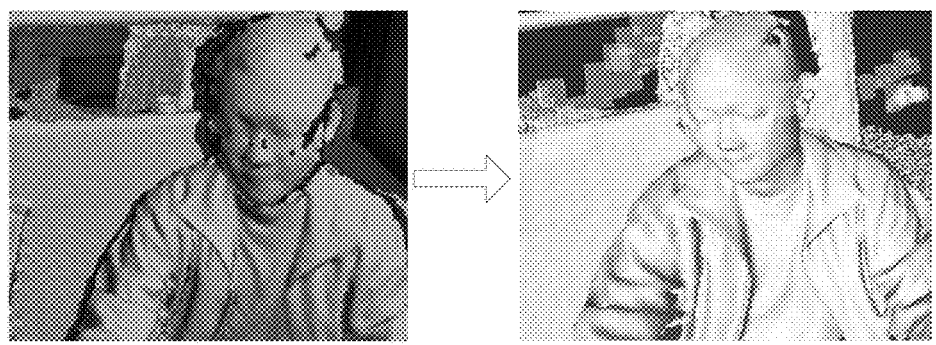
FIG. 4 is a comparison diagram of a three-dimensional image before and after optimization.

In the case that the depth images include both the rigid body and the non-rigid body, in the embodiment of the present invention, the three-dimensional model can be generated according to weights of the rigid depth images and the non-rigid depth images in the depth image sequence. For example, assuming that the rigid body mosaicing result is x, and the non-rigid body mosaicing result is y, the mosaicing result of a general object after weighting can be expressed as: $z=Ax+By$, wherein A and B respectively represent weight indexes of x and y, and z represents a finally acquired registering result. When the scanned object is the rigid body, $A=1$, $B=0$, and when the scanned object is the non-rigid body, $A=0$, $B=1$. For any object to be scanned, a numerical value of the most appropriate weight index can be acquired by adjusting the weight indexes for twice, so that the registering result is the optimal. FIG. 4 shows the three-dimensional human body model acquired by an ordinary registering method on the left side and shows the three-dimensional human body model acquired by the optimized registering method on the right side. It can be seen from the comparison of the two graphs in FIG. 4 that the three-dimensional human body model acquired by the optimized registering method is more smooth and natural.

In order to better acquire point cloud and reconstruct point cloud grids according to the depth images, after the depth image sequence that covers the model body from 360 degrees is acquired, the depth image sequence requires further reprocessing, and the reprocessing is carried out between step S2 and step S1 and includes the following steps:

preprocessing each frame of depth image in the depth image sequence acquired in step S1 according to the following steps:

estimating the position of the model body in the depth image through segmenting a foreground by a median;

placing a model body outline generating seed at the center of the position;

diffusing the model body outline by depth search based on smoothness constraint, generating an accurate model body outline, extracting the model body outline, and meanwhile removing the rest parts in the depth image as backgrounds; and when the model body outline of the next frame of depth image is extracted, extracting the model body outline in combination with the outline extraction result of the previous frame.

The aforementioned steps will be illustrated below in detail:

step S1 can be implemented according to the following manner:

the model body is photographed by a plurality of depth cameras arranged at different angle positions according to a set photographing frequency, and the model body rotates automatically according to a set angular speed during photography until the plurality of depth cameras arranged at different angle positions acquire the depth image sequence that covers the model body from 360 degrees together.

To acquire a more real fitting effect, the present invention can also add color elements in the fitting. Specifically, a color image sequence from 360 degrees of the model body is photographed by color cameras. For the acquisition method of the color image sequence, reference can be made to the aforementioned acquisition method of the depth image sequence. After acquiring the color image sequence, the color cameras and the depth cameras acquire a relative position relationship by calibration of computer vision technology and can match color images with the depth images according to the relative position relationship between the color cameras and the depth cameras, so as to fuse the color image sequence into the depth image sequence.

After the depth image sequence that covers the model from 360 degrees is acquired, point cloud of the frames of depth images in the depth image sequence is acquired, and point cloud grid reconstruction is carried out to acquire point cloud grids of the frames of depth images. The point cloud grid reconstruction can be carried out by means of triangulation of point cloud data.

The point cloud grid reconstruction is used for preparing for successive mosaicing and fusion of the point cloud grids. The specific implementation of step S1 is as follows: a model is located at the axle centre of a turn table, the turn table rotates automatically at a set angular speed around the axle center, the model rotates automatically with the axle center of the turn table as a rotating shaft under the drive of the turn table, its autorotation angular speed is the same as a set autorotation angular speed of the turn table, and the depth camera photographs the model during autorotation of the model. This is equivalent to the situation that when the model is statically located at the axle center of the turn table and when the turn table does not rotate, the depth camera rotates around the axle center of the turn table with the axle center of the turn table as the rotating shaft and with the original set angular speed of the turn table as a rotation angular speed and photographs the model during rotation. It is understood from this point that every time the depth camera photographs a frame of depth image, it rotates an angle relative to the axle center where the model is located, and this angle can be calculated by the rotating speed of the turn table and the photographing speed of the depth camera. Meanwhile, the distance from the depth camera to the axle center of the turn table is known. Therefore, the point cloud grid of an arbitrary frame of depth image is selected from the point cloud grids of the frames of depth images acquired in step S2, the point cloud grids of the other frames of depth images can be rotated on this basis according to the autorotation angular speed of the turn table, the distance from the depth camera to the axle center of the turn table and the photographing speed of the depth camera, so as to mosaic the point cloud grids of the frames of depth images together to form the three-dimensional model of the three-dimensional human body of the model.

Step S1 can also be implemented in another manner: the model body is respectively photographed from four different angles by using four depth cameras, and the four depth cameras can be arranged at intervals of 90 degrees. Similar to the first manner, the point cloud grid of an arbitrary frame of depth image can be selected from the point cloud grids of the acquired four frames of depth images, the point cloud grids of the other frames of depth images can be rotated on this basis according to the distances from the four depth cameras to the model and the angular position relationships of the four depth cameras relative to the model, so as to mosaic the point cloud grids of the four frames of depth images together to form the three-dimensional model of the three-dimensional human body of the model.

In the two manners, the depth camera photographs the entirety of the model every time it carries out photography, this may require that the depth camera keeps a larger distance from the model, and in this case, the quality of the depth image photographed by the depth camera may not be guaranteed. To improve the imaging quality of the depth image of the model photographed by the depth camera, on the basis of the basic principles of the two manners, one overall image being acquired by the depth camera at a time can be changed into such a manner that a plurality of positions of the model are photographed by two or more depth cameras from one angle, and the plurality of positions can be mosaiced into one overall image of the model. For example, three depth cameras can be arranged, two depth cameras are arranged to scan an upper part and a lower part of the model body respectively, and the upper part and the lower part are not overlapped; the other depth camera is arranged to scan a middle part of the model body, and the middle part is partially overlapped with the upper part and the lower part; and the three depth cameras are arranged in such a manner that any one of the depth cameras cannot photograph the other two depth cameras when photographing the model body. Therefore, the three depth cameras generate no mutual interference during photographing. Moreover, by adopting this manner, the distances from the depth cameras to the model can be reduced to acquire depth images with higher quality.

Figure 3:
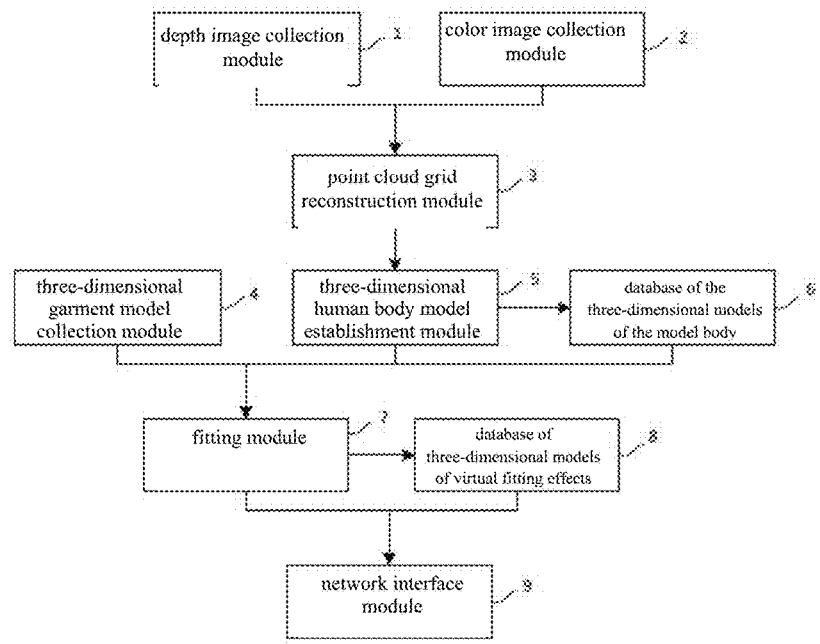
FIG. 3 is a schematic diagram of composition of a virtual network fitting system provided by an embodiment of the present invention.

Based on the above acquisition method of the three-dimensional human body model, the present invention further provides a virtual network fitting system. As shown in FIG. 3, the system includes:

a depth image collection module 1, used for collecting a depth image sequence that covers a model body from 360 degrees;

a point cloud grid reconstruction module 3, used for carrying target depth information point cloud grid reconstruction on each frame of depth image in the depth image sequence;

a three-dimensional human body model establishment module 5, used for mosaicing the reconstructed frames of depth images into a three-dimensional model of the model body;

a three-dimensional garment model collection module 4, used for acquiring a three-dimensional garment model;

a fitting module 7, used for matching the three-dimensional garment model with the three-dimensional model of the model body to generate a three-dimensional model of fitting effects; and a network interface module 9, used for outputting the three-dimensional model of fitting effects through a network.

In the system, the fitting module 7 can be used for generating the three-dimensional garment model according to the specification and the size of the garment, or generating the three-dimensional garment model according to a garment depth image. When the three-dimensional model of the model body is acquired, the model can take a plurality of postures, so that the three-dimensional models of the model body of the plurality of postures are acquired, and a database 6 of the three-dimensional models of the model body is established accordingly.

In the system is further established a database 8 of three-dimensional models of virtual fitting effects, the database 8 of three-dimensional models of virtual fitting effects is generated according to a plurality of fitting training samples, and the fitting training samples are generated according to a plurality of three-dimensional models of fitting effects.

The system further includes a color image collection module 2 used for collecting color images of the model body and the garment and respectively matching and fusing the color images into the three-dimensional model of the model body and the three-dimensional garment model. In this way, real color information can be acquired during the fitting of the model, and thus a more real fitting effect is acquired.

The foregoing descriptions are merely preferred embodiments of the present invention, rather than limiting the present invention. Any modifications, equivalent substitutions, improvements and the like made within the spirit and principle of the present invention shall fall within the protection scope of the present invention.

What is claimed is:

1. A human body model acquisition method based on depth cameras, comprising the following steps:
    step S1: generating mark points covering a model body surface and for determining features of the model body surface on the model body surface, and collecting depth images of the model body from a plurality of angles by using the depth cameras to acquire a depth image sequence that covers the model body surface and contains the mark points;
    step S2: carrying target depth information point cloud grid reconstruction on frames of depth images in the depth image sequence; and
    step S3: mosaicing the reconstructed frames of depth images into a three-dimensional model of the model body according to the mark points in the reconstructed frames of depth images;
    wherein prior to step S2, the method further comprises the following steps:

preprocessing the frames of depth images in the depth image sequence acquired in step S1 according to the following steps:

estimating the position of the model body in the depth image through segmenting a foreground by a median;

placing a model body outline generating seed at the center of the position;

diffusing the model body outline by depth search based on smoothness constraint, generating an accurate model body outline, extracting the model body outline, and meanwhile removing the rest parts in the depth image as backgrounds;

wherein when the model body outline of the next frame of depth image is extracted, extracting the model body outline in combination with the outline extraction result of the previous frame;

wherein when the depth image is a rigid-body depth image:

the step S1 is specifically as follows:

irradiating the model body from 360 degrees by using structured light generated by the depth cameras, so as to generate the mark points for determining the feature information of irradiation sites on the irradiation sites; and collecting the depth images of the irradiation sites by using the depth cameras during the irradiation to acquire the depth image sequence that covers the model body surface and contains the mark points;

the step S3 is specifically as follows:

mosaicing the mark points with correlation higher than a set value according to the correlation of the mark points in every two adjacent frames of depth images in the reconstructed frames of depth images, and deleting the mark points with correlation lower than the set value, so as to mosaic the frames of depth images into the three-dimensional model of the model body;

when the depth image is a non-rigid-body depth image:

the step S1 is specifically as follows:

irradiating the model body from 360 degrees by using light spots of random lattices generated by the depth cameras, so as to generate the mark points for determining the feature information of irradiation sites on the irradiation sites; and collecting the depth images of the irradiation sites by using the depth cameras during the irradiation to acquire the depth image sequence that covers the model body from 360 degrees and contains the mark points; and the step S3 is specifically as follows:

mosaicing the mark points with correlation higher than the set value according to the correlation of the mark points in every two adjacent frames of depth images in the reconstructed frames of depth images, and deleting the mark points with correlation lower than the set value, so as to mosaic the frames of depth images into the three-dimensional model of the model body.

2. The human body model acquisition method based on the depth cameras of claim 1, wherein during the mosaicing, the three-dimensional model is generated according to weights of the rigid-body depth images and the non-rigid-body depth images in the depth image sequence.

3. The human body model acquisition method based on the depth cameras of claim 1, wherein when step S1 is implemented:

the model body is photographed by a plurality of depth cameras arranged at different angle positions according to a set photographing frequency, and the model body rotates automatically according to a set angular speed during photography until the plurality of depth cameras arranged at different angle positions acquire the depth image sequence that covers the model body from 360 degrees together.

4. The human body model acquisition method based on the depth cameras of claim 3, wherein three depth cameras are arranged, and the arrangement positions of the three depth cameras are as follows:

two depth cameras are arranged to scan an upper part and a lower part of the model body respectively, and the upper part and the lower part are not overlapped;

the other depth camera is arranged to scan a middle part of the model body, and the middle part is partially overlapped with the upper part and the lower part; and the three depth cameras are arranged in such a manner that any one of the depth cameras cannot photograph the other two depth cameras when photographing the model body.

5. The human body model acquisition method based on the depth cameras of claim 1, further comprising the following steps:

acquiring a color image sequence that covers the model body from 360 degrees by color cameras; and matching the color image sequence with the depth image sequence, and fusing the color image sequence into the depth image sequence.

6. A human body model acquisition method based on depth cameras, comprising the following steps:

step S1: generating mark points covering a model body surface and used for determining features of the model body surface on the model body surface, meanwhile collecting depth images of the model body from a plurality of angles by using the depth cameras to acquire a depth image sequence that covers the model body surface and contains the mark points;

step S2: carrying target depth information point cloud grid reconstruction on frames of depth images in the depth image sequence; and step S3: mosaicing the reconstructed frames of depth images into a three-dimensional model of the model body according to the mark points in the reconstructed frames of depth images.

7. The human body model acquisition method based on the depth cameras of claim 6, wherein:

when the depth image is a rigid-body depth image:

the step S1 is specifically as follows:

irradiating the model body from 360 degrees by using structured light generated by the depth cameras, so as to generate the mark points for determining the feature information of irradiation sites on the irradiation sites; and collecting the depth images of the irradiation sites by using the depth cameras during the irradiation to acquire the depth image sequence that covers the model body surface and contains the mark points;

the step S3 is specifically as follows:

mosaicing the mark points with correlation higher than a set value according to the correlation of the mark points in every two adjacent frames of depth images in the reconstructed frames of depth images, and deleting the mark points with correlation lower than the set value, so as to mosaic the frames of depth images into the three-dimensional model of the model body;

when the depth image is a non-rigid-body depth image:

the step S1 is specifically as follows:

irradiating the model body from 360 degrees by using light spots of random lattices generated by the depth cameras, so as to generate the mark points for determining the feature information of irradiation sites on the irradiation sites; and collecting the depth images of the irradiation sites by using the depth cameras during the irradiation to acquire the depth image sequence that covers the model body from 360 degrees and contains the mark points; and the step S3 is specifically as follows:

mosaicing the mark points with correlation higher than the set value according to the correlation of the mark points in every two adjacent frames of depth images in the reconstructed frames of depth images, and deleting the mark points with correlation lower than the set value, so as to mosaic the frames of depth images into the three-dimensional model of the model body.

8. The human body model acquisition method based on the depth cameras of claim 7, wherein during the mosaicing, the three-dimensional model is generated according to weights of the rigid-body depth images and the non-rigid-body depth images in the depth image sequence.

9. The human body model acquisition method based on the depth cameras of claim 6, wherein prior to step S2, the method further comprises the following steps:

preprocessing the frames of depth images in the depth image sequence acquired in step S1 according to the following steps:

estimating the position of the model body in the depth image through segmenting a foreground by a median;

placing a model body outline generating seed at the center of the position;

diffusing the model body outline by depth search based on smoothness constraint, generating an accurate model body outline, extracting the model body outline, and meanwhile removing the rest parts in the depth image as backgrounds; and when the model body outline of the next frame of depth image is extracted, extracting the model body outline in combination with the outline extraction result of the previous frame.

10. The human body model acquisition method based on the depth cameras of claim 6, wherein when step S1 is implemented:

the model body is photographed by a plurality of depth cameras arranged at different angle positions according to a set photographing frequency, and the model body autorotates according to a set angular speed during photography until the plurality of depth cameras arranged at different angle positions acquire the depth image sequence that covers the model body from 360 degrees together.

11. The human body model acquisition method based on the depth cameras of claim 10, wherein three depth cameras are arranged, and the arrangement positions of the three depth cameras are as follows:

two depth cameras are arranged to scan an upper part and a lower part of the model body respectively, and the upper part and the lower part are not overlapped;

the other depth camera is arranged to scan a middle part of the model body, and the middle part is partially overlapped with the upper part and the lower part; and the three depth cameras are arranged in such a manner that any one of the depth cameras cannot photograph the other two depth cameras when photographing the model body.

12. The human body model acquisition method based on the depth cameras of claim 6, further comprising the following steps:

acquiring a color image sequence that covers the model body from 360 degrees by color cameras; and matching the color image sequence with the depth image sequence, and fusing the color image sequence into the depth image sequence.

13. The human body model acquisition method based on the depth cameras of claim 6, further comprising the following steps:

acquiring a plurality of three-dimensional models of the model body, and establishing a database of the three-dimensional models of the model body;

acquiring three-dimensional models of model fitting effects when a model tries garments with different sizes and at different postures, and establishing virtual fitting training samples accordingly; and carrying out fitting training according to the virtual fitting training samples, and establishing a database of the three-dimensional models of the virtual model fitting effects.

14. The human body model acquisition method based on the depth cameras of claim 6, further comprising the following steps:

acquiring a three-dimensional garment model, and matching the three-dimensional garment model with the three-dimensional model of the model body to generate a three-dimensional model of virtual fitting effects.

15. A virtual network fitting method based on depth cameras, comprising collecting a depth image sequence that covers a model body from 360 degrees;

carrying target depth information point cloud grid reconstruction on each frame of depth image in the depth image sequence;

mosaicing the reconstructed frames of depth images into a three-dimensional model of the model body;

acquiring a three-dimensional garment model;

matching the three-dimensional garment model with the three-dimensional model of the model body to generate a three-dimensional model of fitting effects; and outputting the three-dimensional model of fitting effects through a network.

16. The virtual network fitting method based on the depth cameras of claim 15, wherein the three-dimensional garment model is generated according to the specification and the size of the garment.

17. The virtual network fitting method based on the depth cameras of claim 15, wherein the three-dimensional garment model is generated according to a garment depth image.

18. The virtual network fitting method based on the depth cameras of claim 15, wherein the three-dimensional model of the model body comprises three-dimensional models of the model body of a plurality of postures, and the method further comprises:

storing the three-dimensional models of the model body of different postures.

19. The virtual network fitting method based on the depth cameras of claim 15, wherein a database of three-dimensional models of virtual fitting effects is generated according to a plurality of fitting training samples; and the fitting training samples are generated according to a plurality of three-dimensional models of fitting effects.

20. The virtual network fitting method based on the depth cameras of claim 15, further comprising:

collecting color images of the model body and the garment and respectively matching and fusing the color images into the three-dimensional model of the model body and the three-dimensional garment model.

\* \* \* \* \*